United States Patent Office

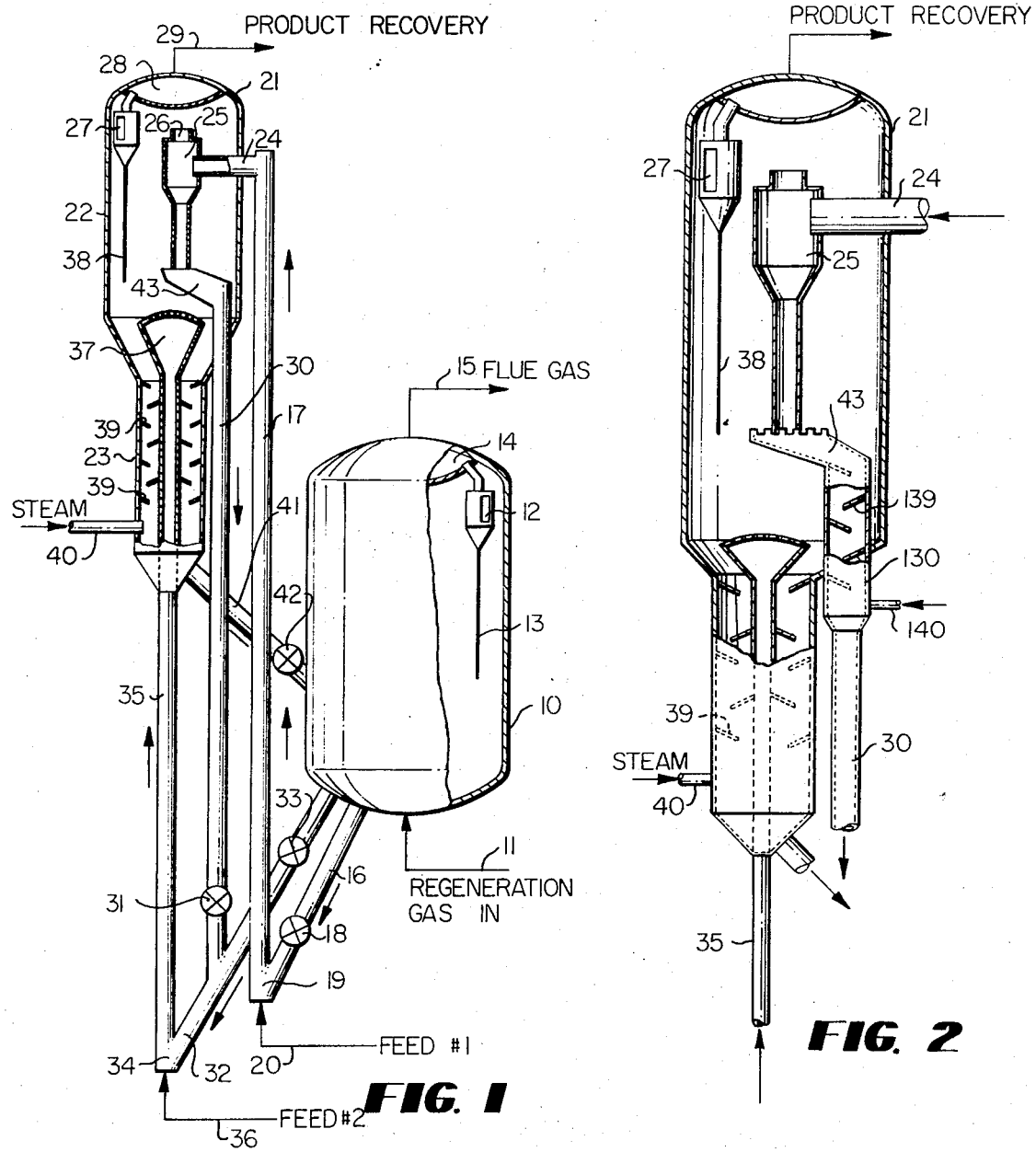

3,679,576
Patented July 25, 1972

3,679,576
FLUIDIZED CATALYTIC CRACKING APPARATUS AND PROCESS
Gerald W. G. McDonald, Summit, N.J., assignor to Commonwealth Oil Refining Company, Inc., New York, N.Y.
Filed Jan. 6, 1970, Ser. No. 964
Int. Cl. B01j 9/20; C10g 11/18, 37/02
U.S. Cl. 208—74
11 Claims

ABSTRACT OF THE DISCLOSURE

A process and apparatus for the catalytic cracking of hydrocarbons under fluid catalytic cracking conditions wherein the maximum efficiency is obtained from a catalyst by serially contacting various hydrocarbon feeds with a catalyst in an apparatus providing a plurality of riser reactors connected in series. With the use of this apparatus and process, the maximum use is made of the catalyst before regeneration of the catalyst is necessary.

DISCLOSURE

This invention relates to an apparatus and process for fluid catalytic cracking. In particular, this invention relates to an improved riser reactor type catalytic cracker and to a fluid catalytic cracking process wherein the catalyst serially contacts hydrocarbon feeds to achieve maximum conversion with the minimum of coke formation.

PRIOR ART

In the fluidized catalytic cracking process, a charge stock is contacted with a fluidized catalyst under conditions such that substantial portions of a hydrocarbon feed are transformed into desirable products such as gasoline, liquified petroleum gas, alkylation feedstocks, middle distillate blending stocks, and the like. During this process various undesirable side products are also produced. The principal undesirable side product is coke which deposits on and contaminates the catalyst. When substantial quantities of coke are deposited on the catalyst, the catalyst activity is reduced and the proportion of deleterious side product increases. This coke contamination of the catalyst requires the periodic removal of the catalyst from the reaction zone for regeneration. The process of the prior art can be carried out in equipment of the riser reactor or transfer line type, fluidized bed type or a combination of the two.

It has been found advantageous in the art to contact feeds of different physical properties with the catalyst for different times so that each feed is cracked at optimum process conditions. The successive dual contact is usually achieved in the prior art by contacting one feed in an efficient riser reactor (also called a transfer line reactor) while the other feed is contacted in a dense or fluid bed reactor. In the riser reactor the catalyst gas-oil mixture moves at a velocity of at least five (5) feet per second. The velocities in the dense bed reactor are less than five (5) feet per second, therefore the contact time between catalyst and hydrocarbon in the dense bed reactor must be longer to achieve the same degree of conversion. This longer contact time results in higher coke production. Such an apparatus and method is demonstrated by Bunn et al. in U.S. Pat. 3,448,037 patented June 3, 1969. Bunn et al. discloses a system wherein catalyst fed from a regenerator contacts a feed in a riser reactor called an elongated reaction zone by Bunn et al. The fluid mass is then discharged into a separating zone above a dense bed reactor wherein the product is removed through a cyclone separator and the catalyst falls into the dense bed reactor. A second riser carries catalyst from the regenerator and a second hydrocarbon feed directly into the dense bed reactor. Catalyst is constantly removed from the dense bed reactor and returned to the regenerator.

A similar system is shown by Lacroix in U.S. Pat. 2,996,354 patented Aug. 15, 1961, wherein an apparatus is shown for moving bed reactions using a combination of transfer line reactors and dense bed reactors.

In a pure transfer line reactor system, as illustrated by Smith in U.S. Pat. 3,041,273 patented June 26, 1962; Peet in U.S. Pat. 3,158,562 patented Nov. 24, 1964; or Sharp et al. in U.S. Pat. 3,246,960 patented Apr. 19, 1966, the catalyst and feed pass once through the reaction zone and then catalyst returns to the regenerator. This type of system does not make a full and efficient use of the catalyst before regeneration. Friedman in U.S. Pat. 3,182,011 patented May 4, 1965, attempts to improve the efficiency of the riser reactor by introducing different feed stocks at different levels in a single riser reactor.

SUMMARY OF INVENTION

It is therefore an object of this invention to provide an improved method for the catalytic conversion of hydrocarbon feed.

Another object of this invention is to provide a method for the fluid catalytic cracking of hydrocarbon feed wherein the hydrocarbon feed is contacted with catalyst possessing maximum activity under selective conditions providing maximum recovery of products with minimal formation of undesired material.

Yet another object of this invention is to provide a method of increasing the ratio of catalyst feed contact passes to catalyst regeneration passes.

A still further object of this invention is to provide a novel riser reactor wherein the catalyst is serially contacted with hydrocarbon feeds of the same or different composition.

An additional object is to provide a novel riser reactor apparatus wherein a plurality of riser reactors are connected in series.

Yet another object provides an apparatus wherein the catalyst is at least partially stripped when being passed from one reactor to a successive reactor.

Other objects and advantages will become apparent from the following description.

The invention contemplates a novel method for serially contacting oil feeds of the same or different composition with catalyst under riser reactor conditions. The invention also contemplates a novel riser reactor apparatus adapted to the serial process.

PROCESS ASPECTS

In the process aspect of the invention a catalyst feed is fed from a regenerating zone to the base of a first reaction zone where the finely divided fluidized catalyst feed is mixed with a hydrocarbon material and moved upwardly through this first reaction zone under cracking conditions. The catalyst and hydrocarbon material are then discharged into a first separation or disengaging zone wherein reaction product is removed from the catalyst feed and the catalyst is passed downwardly at a lower velocity to the lower portion of a second reaction zone where a second vaporous hydrocarbon material is fed into the stream. If desired, additional fluidized catalyst can be added to the stream at this point and the resulting mass is again passed upwardly through a second reaction zone under cracking conditions and discharged into a second disengaging zone again separating the reaction products from the catalyst. The successive passes in the reaction zone and catalyst transfers can be continued until the optimum efficiency of the catalyst deteriorates at which time the catalyst is cycled to the regeneration zone. In actual practice it is preferred to have 2–5 reaction passes for every regeneration pass.

APPARATUS ASPECTS

In the apparatus aspects of the invention a catalytic converter system is provided which includes a regenerator which supplies catalyst to a plurality of vertically disposed riser reactors. Each of the riser reactors terminates in a chamber which serves as a disengaging zone. The individual riser reactors are connected in series through the chambers or disengaging zones by vertically disposed spent catalyst transfer conduits. At the base of each riser reactor, there is a feed inlet for introducing vaporized or liquid hydrocarbon feed to the riser reactor. In the last of the riser reactors in the series, a transfer conduit is provided with baffles and stripping gas inlets to operate as a stripping zone. A return conduit is provided from the stripping zone to the regenerator. The base of each reactor is provided with a conduit connection to the regenerator so that additional catalyst can be added to maintain desired temperatures in the reactors. The base of each reactor can also be provide with gas inlets so that steam or other gases can be introduced into the base of the riser reactor to increase the rate of flow of the reaction mass thougs the reactor or to control temperature therein. In an alternate embodiment, the catalyst transfer conduits are provided with baffles and stripping gas inlets so that the catalyst may be at least partially stripped before entering the next successive riser reactor in line.

Now having generally described the processes and apparatus of this invention, reference is made to the drawings to describe a specific embodiment of the invention which is illustrative of the apparatus when two riser reactors are in line.

BRIEF DESCRIPTION OF THE DRAWING

FIG. 1 represents an elevational view of the entire apparatus, partly in section, showing two riser reactors in series.

FIG. 2 is an enlarged detail of FIG. 1 showing an alternate embodiment of the present invention.

GENERAL DESCRIPTION

Referring to the drawings, regenerator 10 is a conventional regenerator vessel such as has been described in the literature, Preferably regenerator 10 is of the down-flow type where the catalyst is regenerated in a dense bed by burning off the non-volatiles, including coke. In such instances regenerator 10 is provided with a regenerating gas feed 11, an internal cyclone separator 12 having a drip leg 13 wherein combustion products are removed from the regenerator 10 through plenum 14 and flue gas line 15.

Conduit 16 is provided to feed regenerated catalyst from regenerator 10 and under the control of slide valve 18 to the base of riser reactor 17. Vaporized or liquid hydrocarbon feel enters base 19 of the reactor 17 from feed line 20. The reactor 17 terminates adjacent a large generally cylindrical shell 21 which has an upper chamber 22 and lower chamber 23. The upper chamber 22 is of a relatively larger cross-sectional area than the lower chamber 23. The reaction mass is passed by means of conduit 24 from reactor 17 to a rough-cut cyclone separator 25. This separator 25 functions as a disengaging zone and is situated within the upper chamber 22 of shell 21 and is in open communication with upper chamber 22 through outlet 26. Reaction products separate from the catalyst and pass through the outlet 26 into upper chamber 22 and are removed through cyclone separator 27 into plenum 28 and subsequently to product recovery line 29. The catalyst passes from separator 25 to stand pipe 30. The top portion of stand pipe 30 is provided with a funnel or "sugar scoop" structure 43 which is in open communication with chamber 22 where the catalyst is de-gassed before passing into the stand pipe 30. Stand pipe 30 is provided with slide valve 31 to control the rate of flow of catalyst from stand pipe 30 into conduit 32. Conduit 32 is in communication with base 34 of the second riser reactor 35 and can communicate with regenerator 10 through slide valve 33. By the use of slide valve 33 an amount of regnerated catalyst can be added to the spent catalyst when necessary to maintain the proper catalyst temperatures in the second riser reactor 35. A second feed line 36 introduces a vaporous or liquid hydrocarbon feed to the base 34 of riser reactor 35. Riser reactor 35 teminates in a perforated, fan-shaped distribution grid 37 which is positioned in the upper chamber 22 of shell 21. The upper chamber 22 of shell 21 functions as a disengaging zone. The upper chamber 22 is provided with cyclone separation 27 through which reaction product is removed. The cyclone separator 27 is provided with a dip-leg 38 which returns catalyst fines to the main mass of catalyst. The length of the dip-leg 38 is not critical but it is preferred that it extends to a level below the "sugar scoop" 43.

Catalyst emerging from the perforated distribution grid 37 falls to the lower chamber 23 of shell 21. The lower chamber 23 of shell 21 envelops the upper portion of reactor 35 and is provided with a plurality of baffles 39 and at least one stripping gas inlet 40. The inlet 40 is positioned near the lower end of chamber 23 below the baffle plates 39. The riser reactor 35 extends into and is surrounded by the shell 21 and terminates in the upper chamber 22 thereof. A transfer conduit 41 is provided at the base of chamber 23 to remove catalyst from the lower portion of chamber 23 and cycle the catalyst under the control of slide valve 42 to the regenerator 10.

An alternate embodiment is shown in FIG. 2 wherein the upper portion 130 of stand pipe 30 below the "sugar scoop" de-gasser 43 provided with a castellated rim is provided with baffles 139 and at least one gas inlet 140 positioned at the lower periphery of the baffles 139. The gas inlets 40 and 140 can terminate in distribution plates (not shown) or other means known and used in the art. The edge or rim of the "sugar scoop" 43 can be of any design know to the art which will improve its function.

The above catalytic converter can be used in the cracking of hydrocarbons in the following manner.

A catalyst is fed from the regenerator 10 to the base of a riser reactor 17.

The catalyst can be any suitable cracking catalyst of the solid refractory metal oxide type known in the art, such as acid treated clays of silica, alumina, magnesia, titania or mixtures of these. Also of importance are the synthetic gel-containing catalysts such as the synthetic and semi-synthetic gels supported on a carrier such as natural clay. Zeolites or other synthetic catalysts are also used. The most popular catalysts in use are silica alumina, silica magnesia and silica alumina-magnesia catalysts. The silica-alumina catalyst may contain up to about 50% alumina. The catalyst should have a particle size of between 20 and 120 microns with most of the particles being between about 20 and 80 microns; preferably the average is about 45 to 70 microns and most preferably the average is 50 to 65 microns.

A vaporized hydrocarbon feed is injected from feed line 20 into the catalyst at the base 19 of riser reactor 17.

The hydrocarbon feed may be of any type, including paraffinic fresh feeds which crack relatively easily, and aromatic fresh feeds and recycle stocks which are refractory. Such feeds are gas oils, heavy naphtha, reduced crudes or heating oils. Typical stocks are light and heavy gas oils obtained by primary distillation, vacuum distillation or coking from crude oils of various sources and reduced crudes. The boiling range of these stocks may vary over a wide range, e.g., 450° to 650° F. for light oils and 650° to 850° F., or even higher, for heavy gas oils. The hydrocarbon feed stock is distributed by partial vaporization or any other technique known in the art. The hydrocarbon feed stock itself fluidizes the reaction mass but other fluidizing gases such as steam may be fed into the reactor from feed line 19 to fluidize the mass if desired. This is particularly desirable during start-up operations.

The reaction mass moves upwardly through the reactor 17 at a linear velocity of at least 5 feet per second preferably between about 10 and 50 feet per second and most preferably between about 12 and 15 feet per second.

The resident time of the catalyst in the reaction zone is about 1–10 seconds and preferably about 2–6 seconds.

The reaction zone in riser reactor 17 is maintained under cracking conditions with the temperature from about 850° F. to about 1050° F. preferably 875° to 1000° F. The catalyst and hydrocarbon are fed to the reaction zone in a catalyst to oil ratio of 5:1 to 35:1, preferably 5:1 to 15:1, and most preferably 6:1 to 12:1.

From the reaction zone of riser reactor 17 the mass is discharged into a disengaging zone in cyclone separator 25 or a similar separator means wherein the linear velocity of the mass drops below the fluidization velocity for the catalyst employed. The catalyst separates from the reaction products by falling downward while the reaction products rise and are removed from the system through product recovery line 29. The recovered products are passed to other steps in the refinery process. The catalyst is first degassed in scoop structure 43 and then is passed through transfer means 30 to the base of a second riser reactor 35 where the catalyst is again contacted with a second feed at inlet 36 which may be the same feed as injected at 20 or a different hydrocarbon feed. The feed can be of a heavier or lighter fraction than previously used or can be recycled material from other steps in the refining process. The hydrocarbon feed itself fluidizes the reaction mass and, if desired, additional catalyst can be added from the regeneration zone to control temperatures within the reactor. The reaction mass is then passed upwardly through the reaction zone of the second riser reactor 35. The reaction zone conditions are dependent on the type of feed employed in the second reaction zone. The reaction mass is discharged from the second reaction zone into upper chamber 22 which functions as a disengaging zone wherein the linear velocity of the mass again drops below that in the reaction zone causing the separation of products and catalyst. From the upper chamber 22 the separated catalyst drops down to lower chamber 23 which functions as a stripping zone where the major portion of entrained and adsorbed hydrocarbon material is displaced from the catalyst. The catalyst is then removed from the stripping zone of lower chamber 23 and cycled to regeneractor 10 wherein the catalyst is regenerated and recycled to the above-described apparatus and process.

In an alternate embodiment, the useful life of the catalyst before regeneration can be extended by providing each transfer conduit with a stripping system wherein a stripping gas, such as steam, is fed through baffle plates of the system counter-currently to the flow of the catalyst. The stripping gas, preferably steam, is fed through the system at a superficial velocity of between 0.5 and 2 feet per second and displaces at least a portion of entrained and adsorbed hydrocarbon material from the catalyst.

The vaporous reaction products of this apparatus and process are passed to fractionators or similar equipment wherein the useful products such as gasoline and other grades of motor-fuel are separated.

The desired end product on which the efficiency of the apparatus and method is calculated is the yield of 400° F. end-point gasoline produced by the reaction. Depending on the feed percent conversion and catalyst the converter of this invention has an efficiency of between 65 and 75% calculated on the gas oil charge converted. The converter of this invention provides an advantage of having a ratio of transfer line reaction passes to regeneration passes of at least 2:1.

Although the invention has been particularly disclosed for an apparatus employing two riser reactors in series it is to be understood that the invention is equally applicable for an apparatus having more than two riser reactors in series. The catalyst mass can be serially passed through successive transfer and reaction zone passes until the optimum efficiency of the catalyst falls below acceptable standards. It is also obvious to one of ordinary skill in the art that the foregoing is presented by way of example only and the invention is not to be unduly restricted thereby since modifications may be made in the device without departing from the spirit thereof.

I claim:

1. An apparatus for catalytic conversion comprising first and second vertically-disposed, serially-connected riser reactors adapted to receive a fluidized catalyst and a charge stock;
a first and a second separation chamber positioned at the termini of the first and the second riser reactor, respectively, said second separation chamber being larger than said first separation chamber, and said first separation chamber being situated within and in communication with said second separation chamber; and
a catalyst transfer means communicating with said first separation chamber and said second riser reactor, adapted to receive separated catalyst from said first separation chamber and to transfer the separated catalyst to said second riser reactor.

2. An apparatus according to claim 1 wherein said second separation chamber is an elongated generally cylindrical shell disposed above and annularly of the terminus of said second riser-reactor and the lower section thereof is disposed below the terminus and annularly of said second riser-reactor, and defines a stripping zone.

3. An apparatus according to claim 1 wherein a regenerated catalyst transfer means is provided from said regenerator to the said second riser reactor and a vertically extending catalyst transfer means is in communication with said regenerated catalyst transfer means and a feed means for said second riser reactor.

4. An apparatus according to claim 3 wherein the vertically-extending catalyst transfer means is provided with baffle plates and a steam inlet, said steam inlet being disposed below said baffle plates to provide a flow of stripping gas counter-currently of the flow of catalyst.

5. Apparatus according to claim 3 wherein the terminus of said second riser-reactor is a distribution grid.

6. The apparatus according to claim 1 additionally comprising a regenerator, a transfer line for conducting regenerated catalyst to the first vertically-disposed riser-reactor; a first gas-oil feed means in communication with said first reactor; means for passing catalyst from said first reactor to the first separation chamber; a distribution grid terminating the second vertically-disposed riser-reactor and extending into said second separation chamber; a vertically-disposed stand pipe in communication with said first separator means and the second vertically-disposed riser-reactor; a transfer line in communication with said regenerator, said stand pipe, and said second reactor; a second feed means in communication with said second reactor; said second separator means being a generally cylindrical shell having an upper and lower section, the upper section of said shell being of larger cross-sectional area than the lower section of said shell and receiving the distribution grid therein, and the lower section of said shell being provided with baffle plates and stripping gas inlets below the baffle plates; a transfer conduit in communication with the lower section of said shell and the regenerator; and a product removal means in communication with the upper section of said shell.

7. An apparatus according to claim 6 wherein each of said transfer lines to and from the regenerator and said stand pipe is provided with a valve means to control the rate of flow of material in the respective line.

8. An apparatus according to claim 7 wherein the stand pipe is provided with a stripping means.

9. A catalytic cracking process which comprises passing a first vaporous hydrocarbon material and a finely-divided fluidized catalyst upwardly through a first reaction zone under cracking conditions; separating catalyst from reaction products produced in the first reaction zone in a first disengaging zone; transferring the catalyst from said first disengaging zone to a lower portion of a second reaction zone; passing a second vaporous hydrocarbon material and transferred catalyst upwardly through the second reaction zone under cracking conditions; separating catalyst from reaction products produced in the second reaction zone in a second disengaging zone; commingling the reaction products; serially continuing successive transfer and catalyst feed passes until the optimum efficiency of the catalyst deteriorates; and then passing spent catalyst to a regeneration zone.

10. A process according to claim 9 wherein steam is passed countercurrently to the catalyst flow during transfer from the upper portion of one reaction zone to the succeeding reaction zone, at least partially stripping said catalyst.

11. A process according to claim 9 wherein the catalyst is at least partially stripped before passing to the regeneration zone.

References Cited

UNITED STATES PATENTS

| | | | |
|---|---|---|---|
| 2,488,713 | 11/1949 | Delattre-Seguy | 208—74 |
| 2,379,159 | 6/1945 | Kanhofer | 208—74 |
| 2,311,564 | 2/1943 | Munday | 208—164 X |
| 3,494,858 | 2/1970 | Luckenbach | 208—164 |
| 2,416,730 | 3/1947 | Arveson | 208—74 X |
| 2,461,958 | 2/1949 | Bonnell | 208—74 |
| 2,956,003 | 10/1960 | Marshall et al. | 208—74 |
| 3,355,380 | 11/1967 | Luckenbach | 208—164 X |

DELBERT E. GANTZ, Primary Examiner

G. E. SCHMITKONS, Assistant Examiner

U.S. Cl. X.R.

23—288 S; 208—67, 120, 164